(12) United States Patent
Grion (10) Patent No.: US 7,372,769 B2
(45) Date of Patent: May 13, 2008

(54) METHOD AND APPARATUS FOR ADAPTIVE OVER/UNDER COMBINATION OF SEISMIC DATA

(75) Inventor: Sergio Grion, Redhill (GB)

(73) Assignee: Western Geco L.L.C., Houston, TX (US)

(*) Notice: Subject to any disclaimer, the term of this patent is extended or adjusted under 35 U.S.C. 154(b) by 362 days.

(21) Appl. No.: 11/101,740

(22) Filed: Apr. 8, 2005

(65) Prior Publication Data

US 2006/0227659 A1 Oct. 12, 2006

(51) Int. Cl.
*G01V 1/38* (2006.01)

(52) U.S. Cl. .......................................... 367/24; 367/21

(58) Field of Classification Search .................. 367/21, 367/24
See application file for complete search history.

(56) References Cited

U.S. PATENT DOCUMENTS

| 6,477,470 B2 * | 11/2002 | Fokkema et al. ............. 367/21 |
| 6,775,618 B1 * | 8/2004 | Robertsson et al. .......... 367/24 |
| 2004/0218470 A1 | 11/2004 | Vaage |

FOREIGN PATENT DOCUMENTS

| GB | 2 401 180 | 11/2004 |
| GB | 2 405 473 | 3/2005 |

OTHER PUBLICATIONS

Brink, "Application of vertical receiver arrays in 3D seismic exploration," *49th Mtg. Europ. Assn. Expl. Geophys. Expanded Abstracts*, 1987.

Canter et al., "Marine seismic cable steering and control," *62nd Mtg. Europ. Assn. Geophys. Eng., Expanded Abstracts*, 2000.

Grion et al., Good data in bad weather: can quantity make up for quality? *70th Ann. SEG Mtg., Expanded Abstracts*, pp. 171-174, 2000.

Grion et al., "Over/under acquisition: breaking the resolution limits," *EAGE 63rd Conference and Exhibition*, Amsterdam, The Netherlands, Jun. 2001.

Hagras et al., "The over/under acquisition test—taking the seismic to the technical limits," from URL http://aapg.confex.com/aapg/cairo2002/techprogram/paper_65260.htm.

Monk, "Wavefield separation of twin streamer data," *First Break*, 8(3):96-104, 1990.

Posthumus, "Deghosting using a twin streamer configuration," *Geophys. Prosp.*, 41:267-286, 1993.

Singh et al., "Broadband receiver response from dual-streamer data and applications in deep reflection seismology," *Geophys.*, 61(1):232-243, 1996.

Sonneland et al., "2-D deghosting using vertical receiver arrays," *SEG Ann. Mtg.*, 516-519, 1986.

UK Search Report dated Aug. 2, 2006 for Application No. GB 0606897.7.

* cited by examiner

*Primary Examiner*—Ian J. Lobo
(74) *Attorney, Agent, or Firm*—Jeffrey A. Pyle; Liangang (Mark) Ye; Jeffrey E. Griffin (57) ABSTRACT

The present invention provides a method and apparatus for wave field separation. The method includes determining a first operator using marine seismic data acquired at a first depth and receivers deployed at a second depth, determining a second operator using marine seismic data acquired at a second depth, wherein the second depth is greater than the first depth, and forming a de-ghosted data set from the marine seismic data set based upon the first and second operators.

29 Claims, 8 Drawing Sheets

METHOD AND APPARATUS FOR ADAPTIVE OVER/UNDER COMBINATION OF SEISMIC DATA

BACKGROUND OF THE INVENTION

1. Field of the Invention

This invention relates generally to marine seismic surveying, and, more particularly, to adaptive over/under combination of seismic data acquired in a marine seismic survey.

2. Description of the Related Art

Seismic exploration is widely used to locate and/or survey subterranean geological formations for hydrocarbon deposits. Since many commercially valuable hydrocarbon deposits are located beneath bodies of water, various types of marine seismic surveys have been developed. In a typical marine seismic survey, such as the exemplary survey 100 conceptually illustrated in FIG. 1, marine seismic streamer 105 is towed behind a survey vessel 110. The seismic streamer 105 may be several thousand meters long and contain a large number of sensors 115, such as hydrophones and associated electronic equipment, which are distributed along the length of the each seismic streamer cable 105. The survey vessel 110 also includes one or more seismic sources 120, such as airguns and the like.

Figure 1:
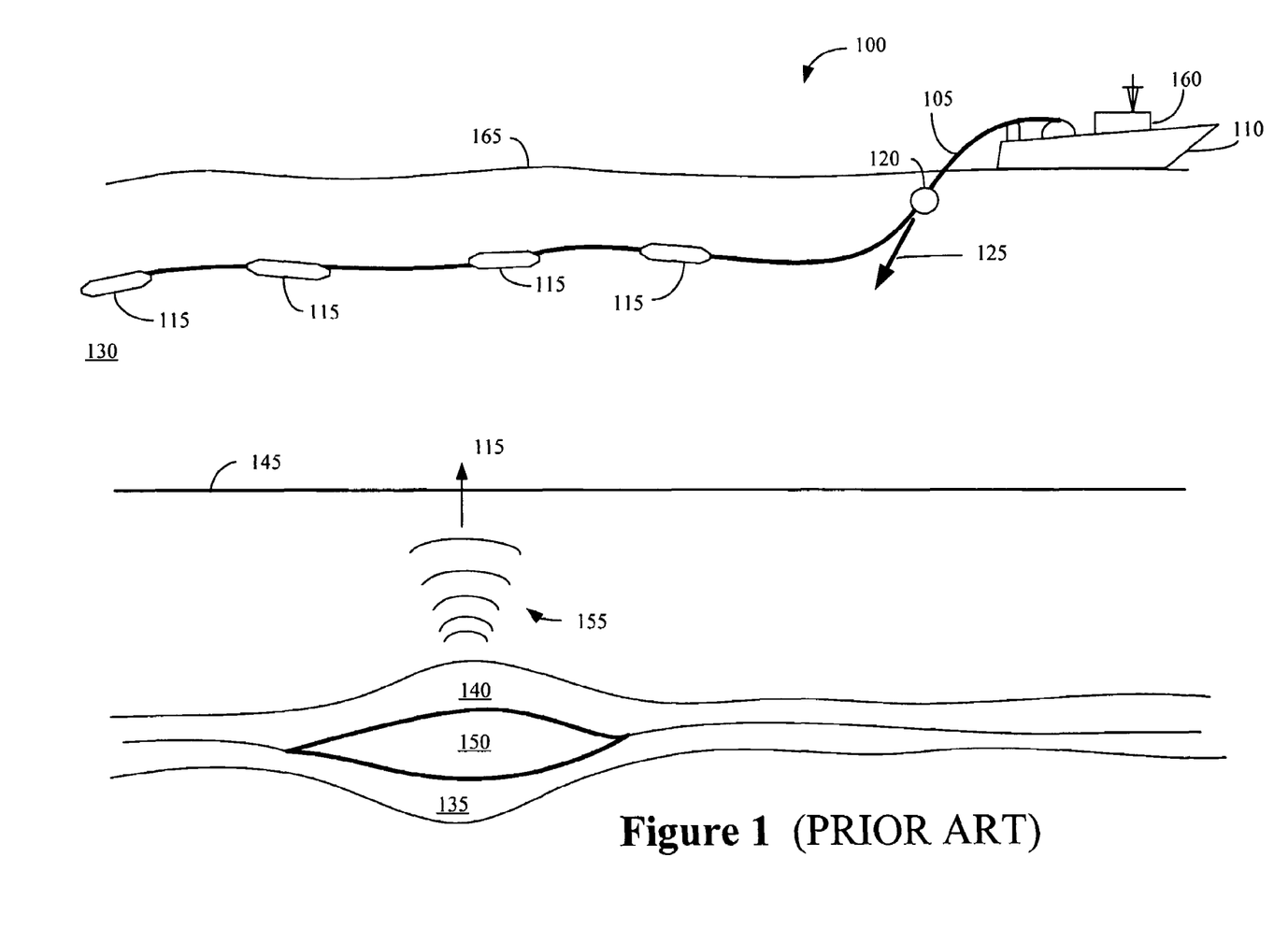
FIG. 1 shows one embodiment of a conventional marine seismic survey system.

As the streamer 105 is towed behind the survey vessel 110, acoustic signals 125, commonly referred to as "shots," produced by the seismic source 120 are directed down through the water column 130 into strata 135, 140 beneath a seafloor 145, where they are reflected from the various subterranean geological formations 150. Reflected signals 155 are received by the sensors 115 in the seismic streamer cable 105, digitized, and then transmitted to the survey vessel 110. The digitized signals are referred to as "traces" and are recorded and at least partially processed by a signal processing unit 160 deployed on the survey vessel 110. The ultimate aim of this process is to build up a representation of the subterranean geological formations 150. Analysis of the representation may indicate probable locations of hydrocarbon deposits in the subterranean geological formations 150.

During a marine seismic survey, the high-frequency content of the acquired seismic data may be increased by deploying the streamer 105 at a shallow depth relative to a surface 165 of the water column 130. However, the low-frequency content of the acquired seismic data, which may be important for stratigraphic and/or structural inversion, may be attenuated when the streamer 105 is deployed at the shallow depth. Thus, the low-frequency content of the acquired seismic data may be enhanced by alternatively deploying the streamer 105 further beneath the surface 165. However, this approach enhances the low-frequency content at the expense of the high-frequency content of the seismic data.

Some of the advantages of deploying the streamer 105 at the shallow depth and some of the advantages of deploying the streamer 105 at a greater depth may be realized in a marine seismic survey that includes streamers 105 deployed at the shallow depth and at the greater depth. For example, a streamer 105 may be deployed at a depth of 6 meters and another streamer 105 may be deployed at a depth of 9 meters. This arrangement of the streamers 105 is sometimes referred to as an over/under combination of the streamers 105. The term "over" is typically associated with the shallow streamer 105 and the term "under" is typically associated with the deep streamer 105. The over/under combination technique is also known as a dual-streamer de-ghosting technique, an acoustic wave field decomposition, and the like. Moreover, the vertically-separated seismic sensors 115 may be referred to as a vertical receiver array.

Figure 2:
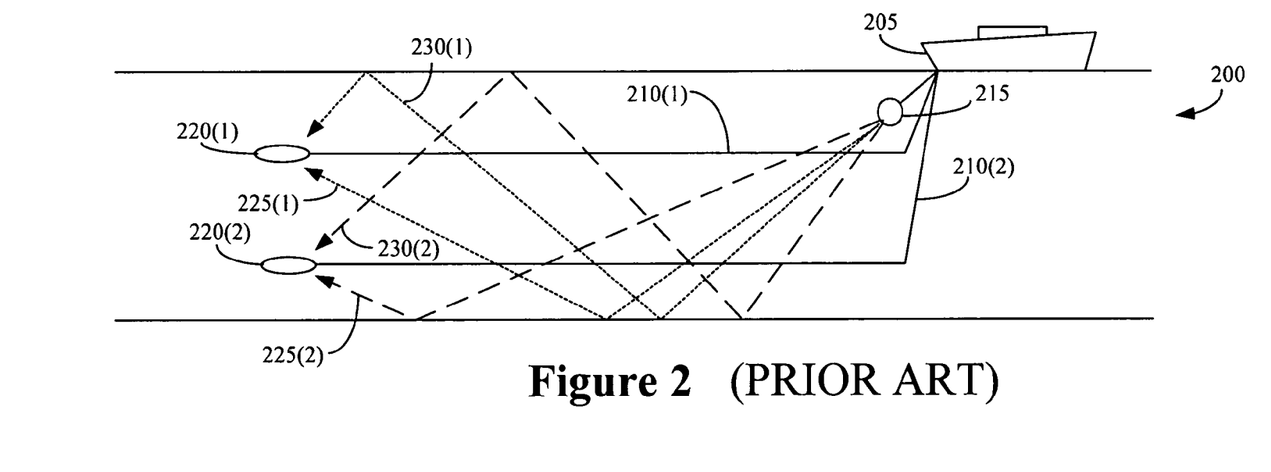
FIG. 2 conceptually illustrates one embodiment of a conventional system that may be used to perform a marine seismic survey using an over/under combination technique.

FIG. 2 conceptually illustrates an alternative embodiment of a conventional system 200 that may be used to perform a marine seismic survey using an over/under combination technique. The system 200 includes a survey vessel 205, which tows a shallow streamer 210(1) and a deep streamer 210(2). The shallow and deep streamers 210(1-2) each include at least one receiver 220(1-2). A source 215 provides a seismic signal 225 that is received by receivers 220(1-2). As indicated in FIG. 2, the source 215 is typically deployed at a different depth than the receivers 220(1-2). One or more ghost signals 230(1-2) are also received by the receivers 220(1-2). Thus, seismic data acquired by the receivers 220(1-2) includes contributions from at least the seismic signal 225(1-2) and the one or more ghost signals 230(1-2).

Figure 3A:
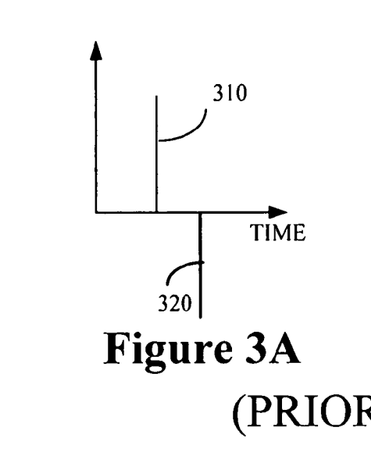
FIGS. 3A-D conceptually illustrate received seismic signals.
Figure 3B:
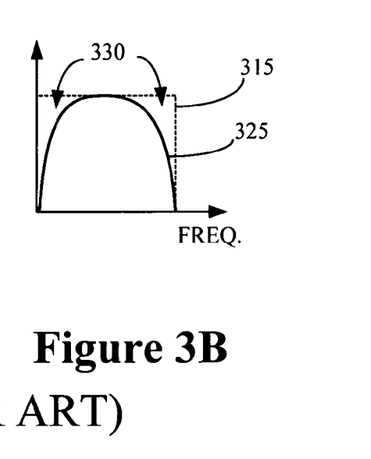

FIGS. 3A-D conceptually illustrate received seismic signals. In particular, FIGS. 3A and 3B conceptually illustrate a seismic signal that may be received by the shallow streamer 210(1) as a function of time (in FIG. 3A) and as a function of frequency (in FIG. 3B). As shown in FIG. 3A, the seismic signal includes an up-going wave field 310, which is approximately a delta-function corresponding to a flat amplitude spectrum seismic signal 315 in the frequency domain shown in FIG. 3B. A down-going wave field 320, corresponding to a ghost signal, is depicted in FIG. 3A as an approximate delta function with a negative amplitude that arrives at a later time than the up-going wave field 310. The "over" recorded seismic data 325 acquired by the shallow streamer 210(1) is a combination of the up-going wave field 310 and the down-going wave field 320. Accordingly, the "over" recorded seismic data 325 may include one or more notches 330 that may not be present in the flat amplitude spectrum seismic signal 315.

Figure 3C:
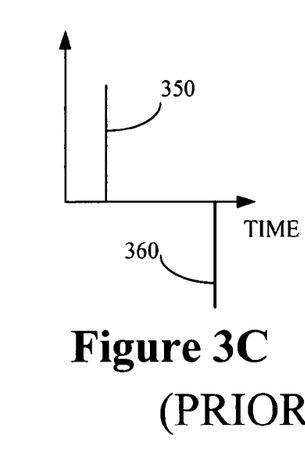
Figure 3D:
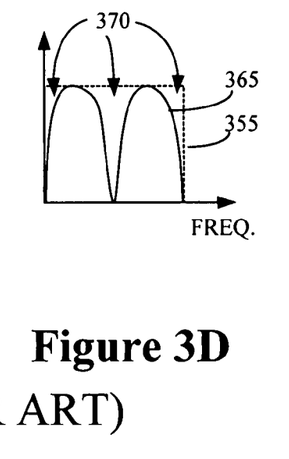

FIGS. 3C and 3D conceptually illustrate a seismic signal that may be received by the deep streamer 210(2) as a function of time (in FIG. 3C) and as a function of frequency (in FIG. 3D). As shown in FIG. 3C, the seismic signal includes an up-going wave field 350, which is approximately a delta-function corresponding to a flat amplitude spectrum seismic signal 355 in the frequency domain shown in FIG. 3D, and a down-going wave field 360, corresponding to a ghost signal, which is depicted in FIG. 3C as an approximate delta function with a negative amplitude that arrives at a later time than the up-going wave field 350. The "under" recorded seismic data 365 acquired by the source 215(2) on the deep streamer 210(2) includes one or more notches 370 that may not be present in the flat amplitude spectrum seismic signal 355.

The notches 330, 370 may result in resolution loss in the acquired seismic data. Thus, over/under combination technique attempts to estimate the up-going and down-going wave fields 310, 350 and 320, 360 by combining the "over" recorded data 325 and the "under" recorded data 365. For example, the up-going wave field 350 and a down-going wave field 360 of the deep streamer 210(2) are separated by a different time lag than the up-going wave field 310 and the down-going wave field 320 of the shallow streamer 210(1). The location of the notches 330, 370 depends on the depth of the streamers 210(1-2) and, consequently, the frequencies of the notches 370 are different than the frequencies of the notches 330. This property may be used to combine the "over" and "under" recorded data 325, 365 to reduce the effect of the notches 330, 370 in the combined data set.

However, independent determinations of the depth of the streamers 210(1-2) are not typically available. Thus, conventional over/under data processing techniques do not account for variations in acquisition parameters, acquisition perturbations, sea height and non-ideal reflectivity, noise, streamer positioning errors, and the like that may reduce the quality of the over/under combination. For example, conventional techniques typically assume a nominal acquisition geometry in which the seismic cables are at a constant depth and are deployed precisely above one another. For another example, one conventional technique further assumes that the sea surface is a flat perfect reflector and applies the corresponding flat sea boundary condition to separate the up-going and down-going wave fields 310, 320, 350, 360, e.g. this conventional over/under data processing technique assumes boundary conditions corresponding to a surface reflectivity of −1 and a 180° phase difference between the up-going and down-going wave fields 310, 320, 350, 360.

The present invention is directed to addressing the effects of one or more of the problems set forth above.

SUMMARY OF THE INVENTION

In one embodiment of the present invention, a method is provided for wave field separation. The method includes determining a first operator using marine seismic data acquired at a first depth and receivers deployed at a second depth, determining a second operator using marine seismic data acquired at a second depth, wherein the second depth is greater than the first depth, and forming a de-ghosted data set from the marine seismic data set based upon the first and second operators.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 4:
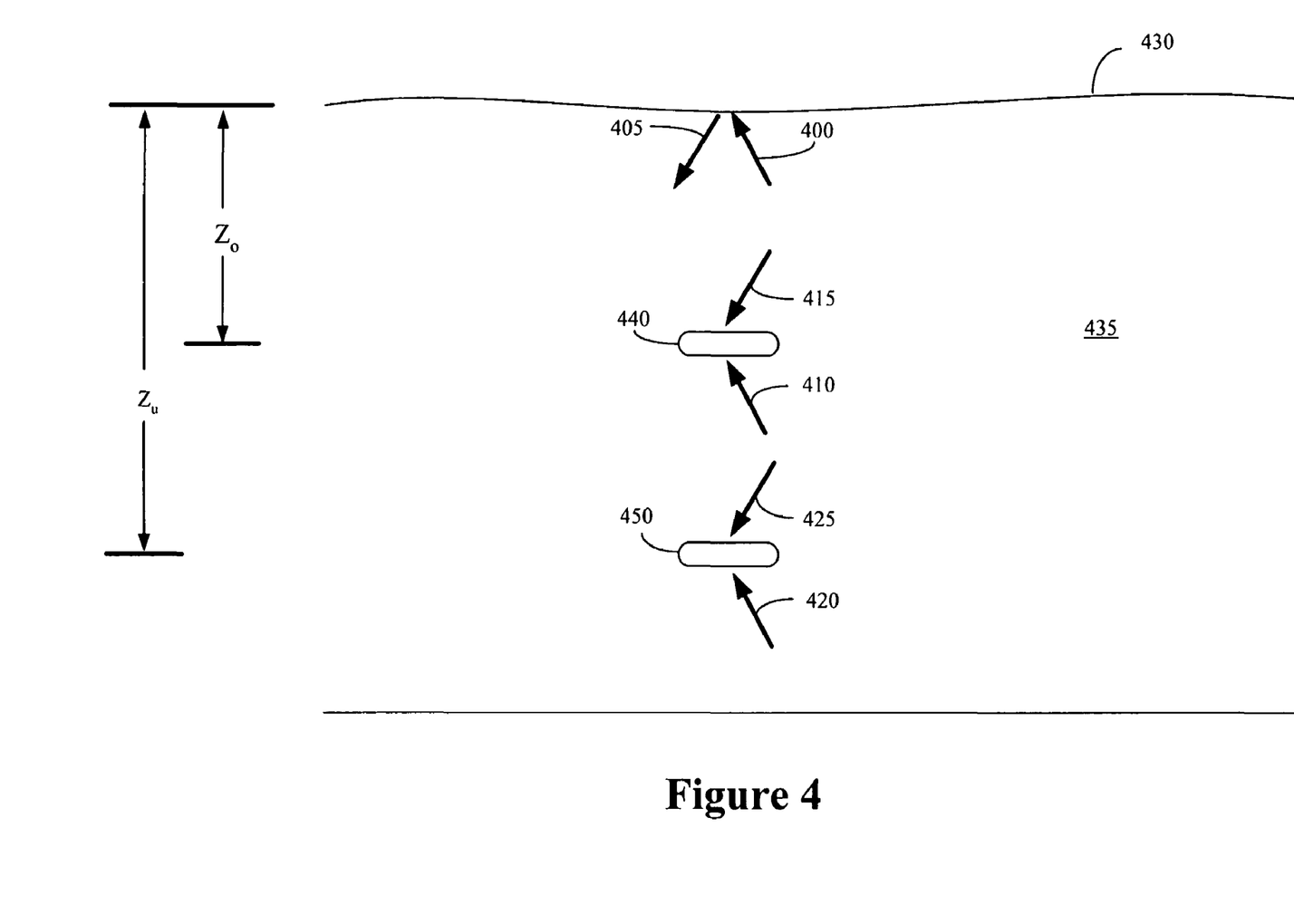
FIG. 4 conceptually illustrates up-going and down-going wave fields corresponding to at least one provided acoustic signal, or shot, in a marine seismic survey.

FIG. 4 conceptually illustrates up-going and down-going wave fields 400, 405, 410, 415, 420, 425 corresponding to at least one provided acoustic signal, or shot, in a marine seismic survey. The direction of propagation (i.e., up or down) is indicated by the arrow of the graphic representing the wave fields 400, 405, 410, 415, 420, 425. Although the up-going and down-going wave fields 400, 405, 410, 415, 420, 425 are discussed herein as if they are separate entities, persons of ordinary skill in the art should appreciate that the up-going and down-going wave fields 400, 405, 410, 415, 420, 425 may represent portions of a single wave field produced by a single shot or portions of a plurality of wave fields produced by a plurality of shots.

An "over" seismic sensor 440 is deployed at a depth $Z_O$ beneath a surface 430 of a body of water 435 and an "under" seismic sensor 450 is deployed at a depth $Z_u$ beneath the surface 430. The "over" seismic sensor 440 detects one or more physical quantities indicative of the up-going and down-going wave fields 410, 415. In one embodiment, the "over" seismic sensor 440 detects a pressure wave field at the location of the "over" seismic sensor 440. The "under" seismic sensor 450 detects one or more physical quantities indicative of the up-going and down-going wave fields 420, 425. In one embodiment, the "under" seismic sensor 450 detects a pressure wave field at the location of the "under" seismic sensor 450.

The wave fields 410, 415, 420, 425 detected by the over and under sensors 440, 450 are used to de-ghost the received wave fields 410, 415, 420, 425 to form a de-ghosted data set. As used herein, the term "de-ghosting" refers to processes and/or techniques that are used to reduce the effects of the receiver ghost signals in the marine seismic data, e.g. the received wave fields 410, 415, 420, 425. For example, de-ghosting may be used to reduce or eliminate notches in the marine seismic data set caused by the ghost signals. Although de-ghosting may significantly improve the quality of the marine seismic data set, persons of ordinary skill in the art should appreciate that the degree of improvement may depend on a variety of factors including the quality of the data, weather conditions at the time the data was acquired, orientation of the receivers 440, 450, and the like. De-ghosting may also be referred to as wave field separation, in accordance with common usage in the art.

Receiver ghost wave fields may be almost purely down-going, and therefore the received wave fields 410, 415, 420, 425 may be de-ghosted, at least in part, by estimating the up-going wave fields 410, 420. In one embodiment, the up-going wave fields 410, 420 may be determined using the relationship:

$$U_P = \frac{F_o^* D_o}{|F_o|^2 + |F_u|^2} + \frac{F_u^* D_u}{|F_o|^2 + |F_u|^2} \qquad \text{Eq. (1)}$$

In Eq. (1), $D_o$ and $D_u$ represents data sets collected by the over and under receivers 440, 450, respectively, and $F_o$ and $F_u$ are forward modeling operators associated with the over and under data sets, respectively. As will be discussed below, the operators $F_o$ and $F_u$ may have a precise mathematical expression that may be a function of streamer depth, water velocity, sea-surface reflection coefficient, and the like. In one embodiment, equation 1 may be defined in the frequency domain. Eq. (1) may also be considered as a least-squares solution to an inverse problem of estimating the up-going wave field from the over and under data.

In one embodiment, a priori knowledge of data and/or model uncertainty may be incorporated into the problem definition. For example a frequency dependent term, $\epsilon$, may be included to add numerical stability (i.e,. dampening) to the inversion procedure. When inversion damping is used, the following equation may be used to determine the up-going wave field 410, 420:

$$U_P = \frac{F_o^* D_o}{|F_o|^2 + |F_u|^2 + \varepsilon} + \frac{F_u^* D_u}{|F_o|^2 + |F_u|^2 + \varepsilon} \qquad \text{Eq. (2)}$$

Inversion damping is a known technique used to solve inverse problems and therefore, in the interest of clarity, specific techniques for inversion dampening and/or specific values of the frequency dependent term, $\epsilon$, will not be discussed herein.

The operators $F_o$ and $F_u$ may be sensitive to errors in streamer depth, water velocity, sea-surface reflection coefficient, and the like. Thus, to reduce and/or eliminate sensitivity to these errors, the operators $F_o$ and $F_u$ are estimated using the data sets $D_o$ and $D_u$ recorded by the over and under receivers 440, 450. Accordingly, knowledge of parameters such as the streamer depth, the water velocity, and the sea-surface reflection coefficient are not required to determine the values of the operators $F_o$ and $F_u$. Furthermore, distortions of data amplitude spectra that may be caused by the imaging process may automatically be taken into account when the operators $F_o$ and $F_u$ are estimated using the data sets $D_o$ and $D_u$. Accounting for these distortions may be important for embodiments in which the over/under combination is carried out using post-stack data. However, persons of ordinary skill in the art having the benefit of this disclosure should appreciate that the present invention is not limited to post-stack data. In alternative embodiments, pre-stack data may also be used, as will be discussed below.

Figure 5:
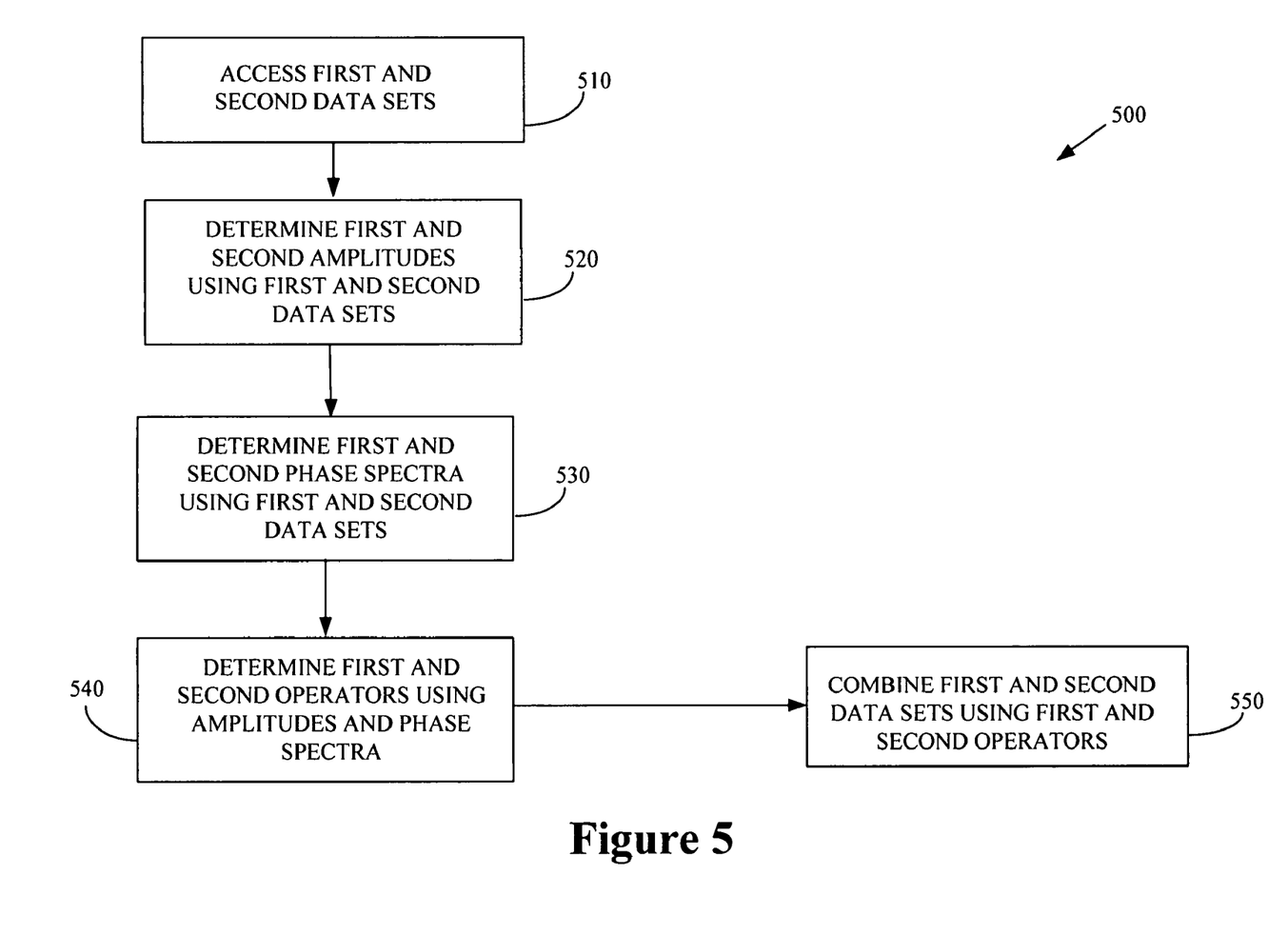
FIG. 5 conceptually illustrates one exemplary embodiment of a method of combining over/under marine seismic data, in accordance with the present invention.

FIG. 5 conceptually illustrates one exemplary embodiment of a method 500 of adaptively combining over/under marine seismic data. The term "adaptive" as used herein refers to the method's ability to adapt to the input data because the operators used to combine the over/under data are derived from the marine seismic data and not from a mathematical model. The adaptive method 500 is therefore less sensitive to acquisition parameters and independent of water velocities and the sea-surface reflection coefficients.

The method 500 will be discussed below under the assumption of white reflectivity, i.e. that the sea-surface is calm, flat, and a perfect reflector. However, persons of ordinary skill in the art having the benefit of this disclosure should appreciate that the present invention is not limited to this assumption. As will be discussed below, alternative embodiments of the method 500 may include extensions to rough sea situations. The following discussion of the method 500 will also assume that the recorded data is post-stack data. However, persons of ordinary skill in the art should appreciate that the method 500 may also be applied to pre-stack data, as will be discussed below.

Recorded data sets $D_o$ and $D_u$ are accessed (at 510). In one embodiment, the recorded data sets $D_o$ and $D_u$ may be accessed (at 510) directly from one or more receivers, such as the receivers 440, 450 shown in FIG. 4. Alternatively, the recorded data sets $D_o$ and $D_u$ may be accessed (at 510) from some other location, such as a memory unit located on a survey vessel, a memory unit in some other location, and the like. In various embodiments, the recorded data sets $D_o$ and $D_u$ may be acquired within a selected time window, a selected offset window, a selected gather, a selected shot gather, a selected receiver gather, or in any other desired grouping. Persons of ordinary skill in the art should appreciate that the plurality of data sets may be incorporated into a single data structure and/or stored on a single device. For example, an appropriately indexed data structure may be used to store a superset including the plurality of data sets.

Amplitudes of the operators $F_o$ and $F_u$ are determined (at 520) based on the data sets $D_o$ and $D_u$. In one embodiment, the amplitude of the operators $F_o$ and $F_u$ are determined (at 520) based upon a spectral estimate of the amplitude spectra of one or more recorded wavelets in the recorded data sets $D_o$ and $D_u$. For example, the expected value of the amplitude of the "over" data set $D_o$ may be determined using the formula:

$$E[|D_o|^2] = |S|^2 \cdot |R|^2 \qquad \text{Eq.(3)}$$

In Eq. (3), S is the source signature, R is a receiver or a response, and E[x] is the expected value of x. The receiver array response may be decomposed into several factors, which may include a hydrophone response, a receiver array response, and a receiver ghost response. In the above example, the operator $F_o$ may be derived from the receiver ghost response.

In one embodiment, the receiver array response and/or the hydrophone response may be designed to have a flat amplitude in the frequency range of interest for the recorded data sets $D_o$ and $D_u$. Consequently, the receiver array response may be estimated as $|R|^2 \cong |F_o|^2$. The amplitude spectra may then be determined using the approximate equation $E[|D_o|^2] = |S|^2 \cdot |F_o|^2$, so that the forward operator $F_o$ may be calculated using the equation:

$$|F_o| = \left(\frac{E[|D_o|^2]}{|S|^2}\right)^{1/2} \qquad (4)$$

A similar expression may be derived for the forward operator $F_u$.

The spectral estimates $E[|D_o|^2]$ and $E[|D_u|^2]$ for the over and under recorded data sets $D_o$ and $D_u$ may be substituted into other equation 1 or equation 2 to derive the up-going wave fields 410, 420. For example, the spectral estimates $E[|D_o|^2]$ and $E[|D_u|^2]$ may be used to derive following equation for the up-going wave field 410, 420, represented here by the symbol $U_p$:

$$\frac{U_p}{|S|} = \frac{|S|F_o^* D_o^*}{|S|^2|F_o|^2 + |S|^2|F_u|^2} + \frac{|S|F_u^* D_u}{|S|^2|F_o|^2 + |S|^2|F_u|^2} \quad (5)$$

The asterisk in equation 5 indicates the complex conjugate of the forward operators $F_o$ and/or $F_u$. In one embodiment, the forward operators $F_o$ and/or $F_u$ may be decomposed into an amplitude and a phase spectra to form the equation:

$$\frac{U_p}{|S|} = \frac{\sqrt{E[|D_o|^2]}\, e^{-j\varphi(F_o)} D_o}{E[|D_o|^2] + E[|D_u|^2]} + \frac{\sqrt{E[|D_u|^2]}\, e^{-j\varphi(F_u)} D_u}{E[|D_o|^2] + E[|D_u|^2]} \quad (5)$$

In equation 5, the terms $\varphi(F_o)$ and $\varphi(F_u)$ represent the phase spectra for the over and under operators $F_o$ and $F_u$, respectively.

Phase spectra $\varphi(F_o)$ and $\varphi(F_u)$ for the over and under operators $F_o$ and $F_u$ are determined (at 530). In one embodiment, the up-going wave field shown in equation 1 may be considered at a location just below the sea-surface. If the sea-surface reflection coefficient has a value close to one (e.g., the calm sea-surface discussed above), the mathematical expression for the phase spectra $\varphi(F_o)$ and $\varphi(F_u)$ is approximately piece-wise constant and periodic. In one embodiment, each phase spectrum $\varphi(F_o)$ and $\varphi(F_u)$ has a first approximately constant value over approximately the first half of each period and a second approximately constant value over approximately the second half of each period. For example, the period of the forward operator $F_o$ is approximately equal to $2\tau_0$, where $\tau_0$ is the two-way vertical travel-time for acoustic waves traveling from an over cable to the sea-surface.

The phase spectrum of the forward operator $F_o$ may therefore be characterized by first and second constant values and at least one discontinuity. The discontinuities may be located at frequencies of $1/\tau_0$, $2/\tau_0$, etc. The phase spectrum of the forward operator $F_u$ may also be characterized by first and second constant values and at least one discontinuity. However, persons of ordinary skill in the art should appreciate that the phase spectra of the forward operators $F_o$ and $F_u$ may be characterized by different values of the first and/or second constants, as well as different values of the frequency of the at least one discontinuity.

In one embodiment, determining (at 530) the phase spectra may include determining a phase spectra difference between the phase spectra associated with the data sets $D_o$ and $D_u$. For example, if the cable position is repeated reasonably accurately during acquisition of the over and under data sets $D_o$ and $D_u$, the phase spectra difference between the phase spectra associated with the over and under data sets $D_o$ and $D_u$ may be primarily due to the different phase spectra $\varphi(F_o)$ and $\varphi(F_u)$ of the over and under operators $F_o$ and $F_u$. Since the forward operators $F_o$ and $F_u$ have an approximately piece-wise constant phase, the phase difference between the over and under data sets $D_o$ and $D_u$, as well as the phase spectra, may also be approximately piece-wise constant, under the assumption of a calm sea-surface.

Figure 6:
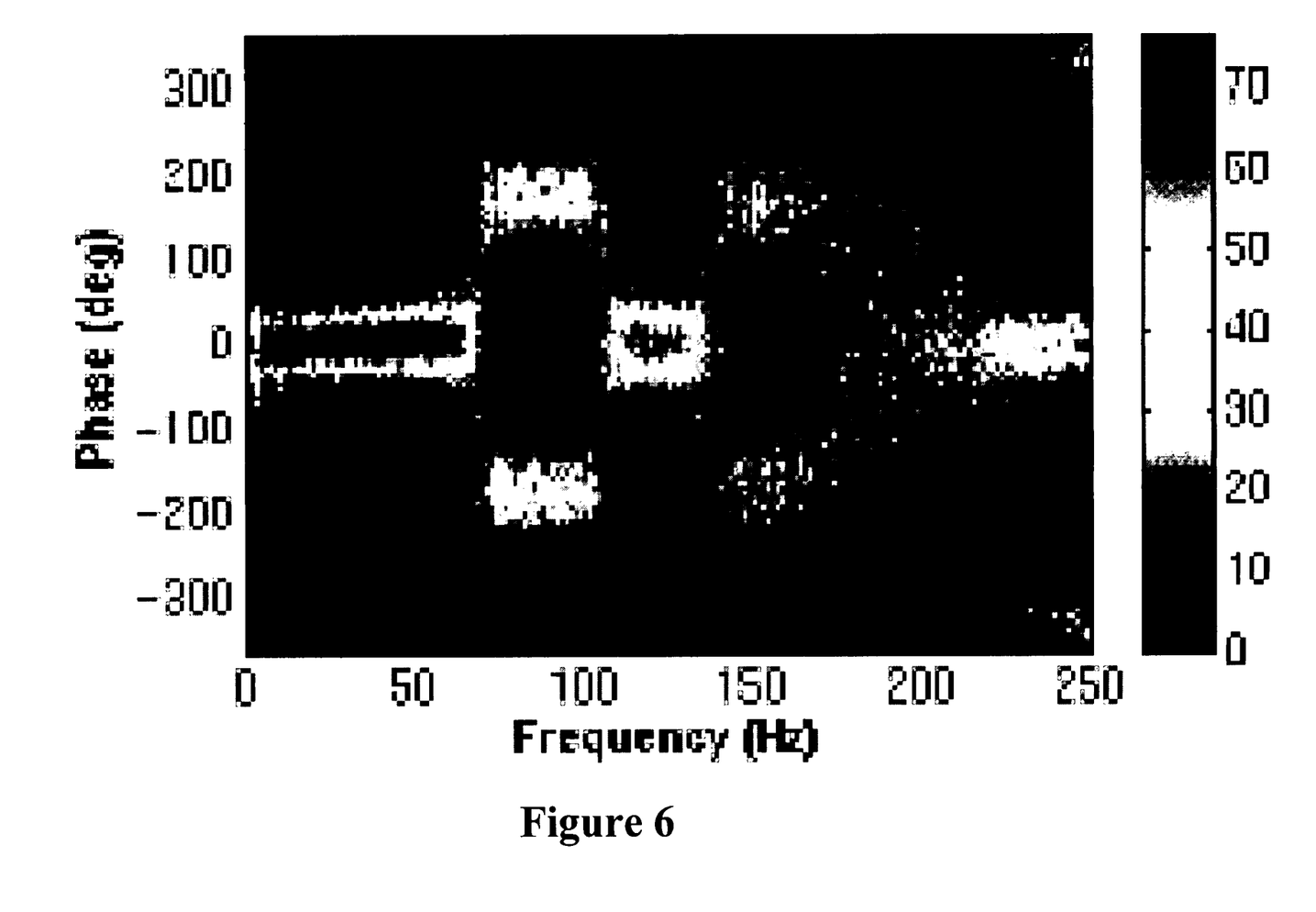
FIG. 6 shows a histogram of post-stack phase differences between over and under data sets, in accordance with the present invention.

FIG. 6 shows a histogram of post-stack phase differences between over and under data sets $D_o$ and $D_u$. The vertical axis of the histogram indicates a phase measured in degrees and the horizontal axis of the histogram indicates a frequency in Hertz. In the illustrated embodiment, the over cable is located at a depth of approximately 7 meters and the under cable is located at a depth of approximately 11 meters and the sea-surface is assumed to be calm. Accordingly, the corresponding ghost notches for vertical propagation occur at approximately 68 Hertz and approximately 107 Hertz. The ghost notches may be identified by the 180 degree phase jumps at approximately 68 Hertz and approximately 107 Hertz. The phase jumps may be positive or negative, i.e. ±180°, due to wrap-around of the phase measurement at approximately 180°.

Figure 7:
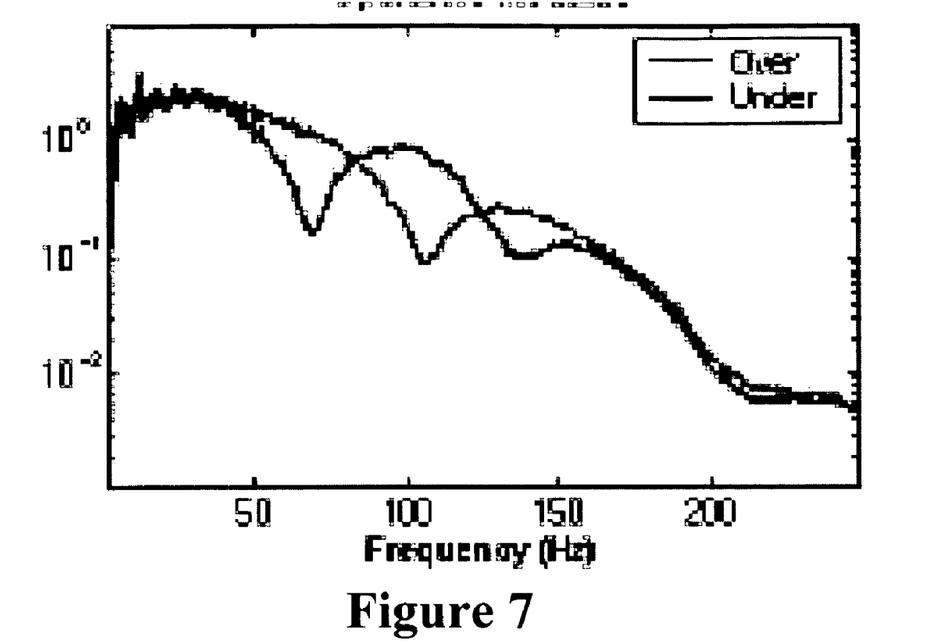
FIG. 7 shows a plot of amplitude spectra of over and under data, in accordance with the present invention.

FIG. 7 shows a plot of amplitude spectra of over and under data. The vertical axis of the plot indicates the amplitude in arbitrary units and the horizontal axis indicates the frequency in Hertz. In the illustrated embodiment, the amplitude spectra have been derived from a post-stack spectral estimate, as discussed above. In the illustrated embodiment, the over cable is located at a depth of approximately 7 meters and the under cable is located at a depth of approximately 11 meters and the sea-surface is assumed to be calm. Accordingly, the corresponding ghost notches for the under cable at approximately 68 Hertz and approximately 140 Hertz. The ghost notch for the over cable may be identified at approximately 107 Hertz.

Figure 8:
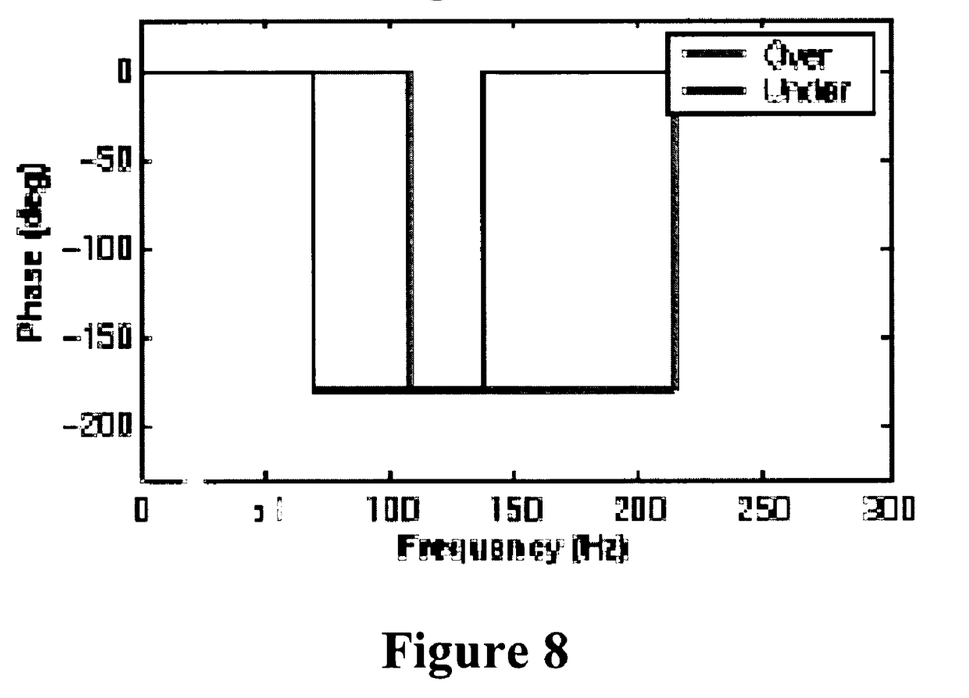
FIG. 8 shows a plot of phase spectra of over and under data, in accordance with the present invention.

FIG. 8 shows a plot of phase spectra of over and under data. The vertical axis of the plot indicates the phase in degrees and the horizontal axis indicates the frequency in Hertz. In the illustrated embodiment, the phase spectra have been derived from a post-stack spectral estimate by assuming that the phase is piece-wise constant between the phase jumps identified from the amplitude spectra in FIG. 7 and/or the phase difference histogram shown in FIG. 6, as discussed above. In the illustrated embodiment, the over cable is located at a depth of approximately 7 meters and the under cable is located at a depth of approximately 11 meters and the sea-surface is assumed to be calm. Accordingly, the phase jumps for the under cable are at approximately 68 Hertz and approximately 140 Hertz, and the phase jumps for the over cable are at approximately 107 Hertz and approximately 210 Hertz.

Referring back to FIG. 5, determining (at 530) the phase spectra may include testing the hypothesis of a calm sea-surface. For example, when the sea-surface reflection coefficient is not close to one (i.e. when the sea-surface is rough), the phase difference between the over and under operators may have a more complex shape than indicated in, e.g., FIG. 6. In general, the phase difference tends to resemble the phase difference for calm seas more closely for frequencies that are more separated from the discontinuities visible in FIG. 6. Thus, the hypothesis of a calm sea-surface may be considered valid when the phase difference is relatively similar to the phase difference for calm seas. The actual degree of difference that may be considered acceptable and/or allowable is a matter of design choice that may depend on such factors as the desired quality of the data. Is the hypothesis of a calm sea-surface is considered valid, the phase within the estimated as discussed above. If the test indicates that the hypothesis is not valid, the aforementioned techniques may still be used to derive the phase spectra. However, the quality of the estimate of the phase spectra may be degraded, especially at frequencies close to the phase discontinuities described above.

The forward operators $F_o$ and $F_u$ may be determined (at 540). For example, the forward operators $F_o$ may be determined (at 540) using the equation:

$$F_o = |S|\sqrt{E[|D_0|^2]}\, e^{j\varphi(F_o)} \quad (6)$$

A similar equation may be used to determine (at 540) the forward operator $F_u$. The over and under data sets may then be combined (at 550). For example, an over/under combination of the data sets may be formed using equation 5.

The method 500 assumes vertical propagation and therefore the post-stack over/under problem becomes one-dimensional. However, the method 500 may be extended to a two-dimensional, pre-stack analysis. In one embodiment, the method 500 may be extended to a two-dimensional, pre-stack analysis by deriving operators from a zero-offset section of the data under the assumption of vertical propagation and then extrapolating the zero-offset solution to higher wave numbers, which may characterize non-vertical propagation. This extrapolation may require knowledge of the water velocity, which may be estimated from the travel time of a direct arrival or of a sea bottom reflection. Alternatively, amplitude spectra of pre-stack operators could be derived from two-dimensional spectral estimate of over and under data, either in the $\tau$-p or the $\theta$-k domain. The phase spectra may then be derived using a piece-wise constant approximation, such as described above. In the pre-stack case, mathematical expressions for the forward operators may indicate that the position of phase discontinuities is a function of wave number and the phase discontinuities may shift to higher frequencies for increasing wave numbers. However, for a given wave number, the phase spectra may still be piece-wise constant.

The method 500 may also be extended to a rough sea approximation. When the sea-surface is rough, phase differences between over and under data are no longer piece-wise constant and so the derivation of the phase spectra described above may be modified to attenuate phase differences between over and under data sets due to rough sea effects. In some embodiments, attenuation of the phase differences may also compensate, at least in part, for small positioning and/or coverage differences between over and under data.

Figure 9:
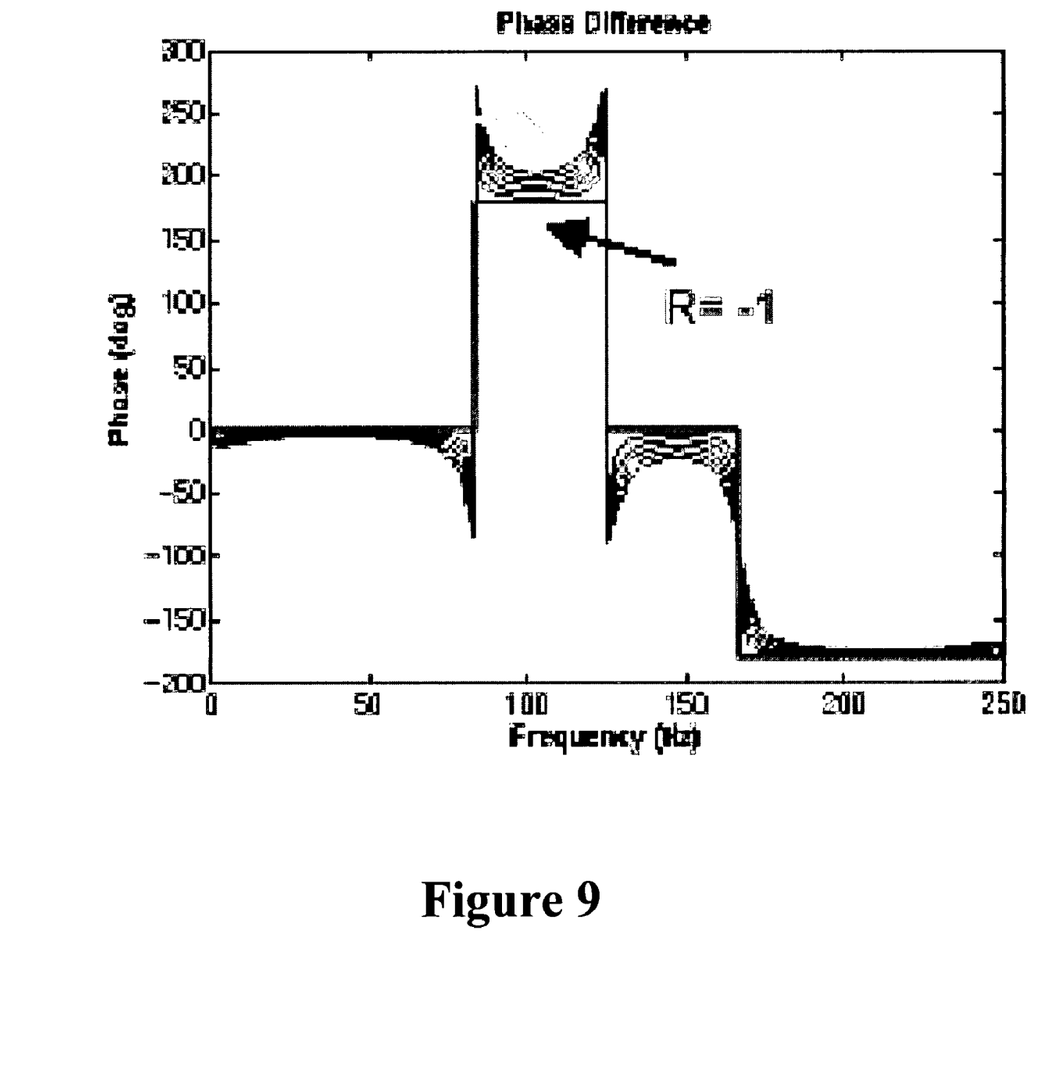
FIG. 9 conceptually illustrates a phase difference between over and under operators as a function of a sea-surface reflection coefficient, in accordance with the present invention.

FIG. 9 conceptually illustrates a phase difference between over and under operators as a function of a sea-surface reflection coefficient. In the illustrated embodiment, the sea-surface reflection coefficient varies from R=−0.7 to R=−1.0. The phase difference is piece-wise constant only for a flat sea-surface (R=−1). The rough sea surface affects the phase difference between the over and under operators, which suggests that it may be possible to compensate for the rough sea effects. In one embodiment, compensation may be performed using a phase matching operator for the over and under data derived from the phase difference between real over and under data. Alternatively, the phase difference for over and under operator phases may be inverted using prior knowledge of mathematical expressions for the operator phases in the presence of R<1 as a constraint. The amplitude spectra of the over and under data may also be affected by the rough sea, but this may be automatically compensated for by the adaptive derivation of the operator amplitude spectra outlined above.

Figure 10A:
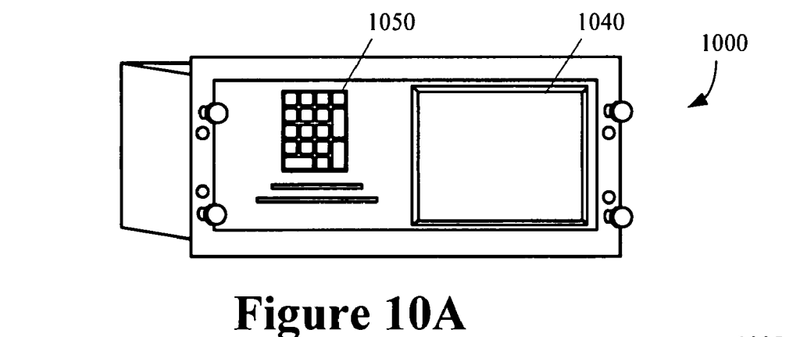
FIGS. 10A and 10B show a computing apparatus, in accordance with the present invention.
Figure 10B:
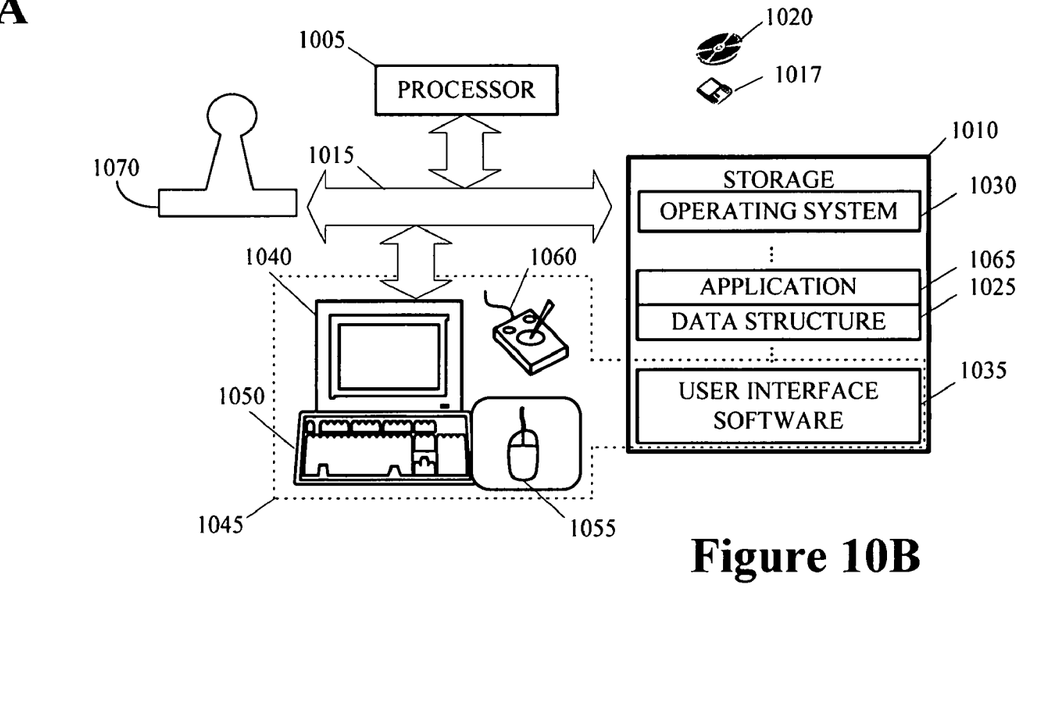

FIGS. 10A and 10B show a computing apparatus 1000 that may be used to perform the aforementioned operations.

The computing apparatus 1000 includes a processor 1005 communicating with some storage 1010 over a bus system 1015. The storage 1010 may include a hard disk and/or random access memory ("RAM") and/or removable storage such as a floppy magnetic disk 1017 and an optical disk 1020. The storage 1010 is encoded with a data structure 1025 storing the signals collected as discussed above, an operating system 1030, user interface software 1035, and an application 1065. The user interface software 1035, in conjunction with a display 1040, implements a user interface 1045. The user interface 1045 may include peripheral I/O devices such as a key pad or keyboard 1050, a mouse 1055, or a joystick 1060. The processor 1005 runs under the control of the operating system 1030, which may be practically any operating system known to the art. The application 1065 is invoked by the operating system 1030 upon power up, reset, or both, depending on the implementation of the operating system 1030.

As discussed above, data collected during the marine seismic survey may be communicated to the computing apparatus 1000 via any storage medium, including, but not limited to, recording tape, magnetic disks, compact disks, and DVDs. The data collected during the marine seismic survey may also be communicated directly to the computing apparatus 1000 by, e.g., a satellite link 1070, and stored in the storage 1010. Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
    determining a first operator from marine seismic data acquired at a first depth, including:
        determining a first spectral estimate based on the marine seismic data, a source signature, and a receiver array response;
    determining a second operator from marine seismic data acquired at a second depth, wherein the second depth is greater than the first depth, including:
        determining a second spectral estimate based on the marine seismic data, a source signature, and a receiver array response; and
    forming a de-ghosted data set from the marine seismic data set based upon the first and second operators.

2. The method of claim 1, wherein determining the first spectral estimate comprises determining at least one amplitude spectrum of at least one recorded wavelet associated with the marine seismic data, and wherein determining the second spectral estimate comprises determining at least one amplitude spectrum of at least one recorded wavelet associated with the marine seismic data.

3. The method of claim 1, wherein determining the first spectral estimate based on the receiver array response comprises determining the first spectral estimate based upon a receiver ghost response, and wherein determining the second spectral estimate based on the receiver array response comprises determining the second spectral estimate based upon a receiver ghost response.

4. The method of claim 1, wherein determining the first and second operators comprises determining first and second phase spectra associated with the first and second operators, respectively.

5. The method of claim 4, further comprising determining a phase difference spectrum between the first and second phase spectra.

6. The method of claim 5, further comprising determining at least one frequency associated with at least one discontinuity in the phase difference spectrum.

7. The method of claim 4, wherein determining the first and second operators comprises determining first and second piece-wise constant and periodical operators.

8. The method of claim 7, wherein determining the first and second piecewise constant and periodical operators comprises determining the first and second piecewise constant and periodical operators based on the at least one discontinuity in the phase difference spectrum.

9. The method of claim 1, wherein forming the de-ghosted data set from the marine seismic data set based upon the first and second operators comprises determining an up-going wave field, a down-going wave field, or both an up-going wavefield and a down-going wavefield based on the first and second operators.

10. The method of claim 9, wherein determining said at least one up-going wave field or down-going wave field comprises determining said at least one up-going wave field or down-going wave field using an over/under combination of the marine seismic data.

11. method of claim 1, wherein determining the first and second operators comprises determining the first and second operators using marine seismic data acquired within one or more of a selected time window, a selected offset window, a selected gather, a selected shot gather, or a selected receiver gather.

12. The method of claim 1, wherein determining the first operator using the marine seismic data comprises determining the first operator using a pre-stack marine seismic data set, a post-stack marine seismic data set, or both a pre-stack marine data set and a post-stack marine seismic data set.

13. The method of claim 1, wherein determining the second operator using the marine seismic data comprises determining the second operator using a pre-stack marine seismic data set, a post-stack marine seismic data set, or both a pre-stack marine data set and a post-stack marine seismic data set.

14. An article comprising one or more machine-readable storage media containing instructions that when executed enable a computer to:
    determine a first operator from marine seismic data acquired at a first depth, including:
        determining a first spectral estimate based on the marine seismic data, a source signature, and a receiver array response;
    determine a second operator from marine seismic data acquired at a second depth, wherein the second depth is greater than the first depth, including:
        determining a second spectral estimate based on the marine seismic data, a source signature, and a receiver array response; and
    form a de-ghosted data set from the marine seismic data set based upon the first and second operators.

15. The article of claim 14, wherein the one or more machine-readable storage media contain instructions that when executed enable the computer to determine the first and second operators comprises determining first and second phase spectra associated with the first and second operators, respectively.

16. The article of claim 15, wherein the one or more machine-readable storage media contain instructions that when executed enable the computer to determine a phase difference spectrum between the first and second phase spectra.

17. The article of claim 14, wherein the one or more machine-readable storage media contain instructions that when executed enable the computer to determine an up-going wave field, a down-going wave field, or both an up-going and a down-going wave field based on the first and second operators.

18. An article comprising one or more machine-readable storage media containing data structures and data formed by:
    determining a first operator from marine seismic data acquired at a first depth, including:
        determining a first spectral estimate based on the marine seismic data, a source signature, and a receiver array response;
    determining a second operator from marine seismic data acquired at a second depth, wherein the second depth is greater than the first depth, including:
        determining a second spectral estimate based on the marine seismic data, a source signature, and a receiver array response; and
    forming a de-ghosted data set from the marine seismic data set based upon the first and second operators.

19. The article of claim 18, wherein the one or more machine-readable storage media contain data structures and data formed by determining the first and second operators comprises determining first and second phase spectra associated with the first and second operators, respectively.

20. The article of claim 19, wherein the one or more machine-readable storage media contain data structures and data formed by determining a phase difference spectrum between the first and second phase spectra.

21. The article of claim 18, wherein the one or more machine-readable storage media contain data structures and data formed by determining an up-going wave field, a down-going wave field, or both an up-going wave field and a down-going wave field based on the first and second operators.

22. A computer programmed to:
  determine a first operator from marine seismic data acquired at a first depth, including:
    determining a first spectral estimate based on the first marine seismic data set, a source signature, and a receiver array response;
  determine a second operator from marine seismic data acquired at a second depth, wherein the second depth is greater than the first depth, including:
    determining a second spectral estimate based on the second marine seismic data set, a source signature, and a receiver array response; and
  form a de-ghosted data set from the marine seismic data set based upon the first and second operators.

23. The computer of claim 22, programmed to determine first and second phase spectra associated with the first and second operators, respectively.

24. The computer of claim 23, programmed to determine a phase difference spectrum between the first and second phase spectra.

25. The computer of claim 22, programmed to determine an up-going wave field, a down-going wave field, or both an up-going wave field and a down-going wave field based on the first and second operators.

26. A system, comprising:
  at least one sensor deployed at a first depth;
  at least one sensor deployed at a second depth, wherein the second depth is greater than the first depth;
  at least one source for providing an acoustic signal; and
  a computing unit programmed to:
    determine a first operator from marine seismic data acquired by the at least one sensor deployed at the first depth in response to the acoustic signal, including:
      determining a first spectral estimate based on the first marine seismic data set, a source signature, and a receiver array response;
    determine a second operator from marine seismic data acquired by the at least one sensor deployed at the second depth in response to the acoustic signal, including:
      determining a second spectral estimate based on the second marine seismic data set, a source signature, and a receiver array response; and
    form a de-ghosted data set from the marine seismic data set based upon the first and second operators.

27. The system of claim 26, wherein the computing unit is further programmed to determine first and second phase spectra associated with the first and second operators, respectively.

28. The system of claim 27, wherein the computing unit is further programmed to determine a phase difference spectrum between the first and second phase spectra.

29. The system of claim 26, wherein the computing unit is further programmed to determine an up-going wave field, a down-going wave field, or both an up-going wave field and a down-going wave field based on the first and second operators.

* * * * *